(12) United States Patent
Blixt et al.

(10) Patent No.: US 10,197,250 B2
(45) Date of Patent: Feb. 5, 2019

(54) SUPPORT RING FOR MOUNTING OF A SOFT BOX ON A LIGHT SOURCE

(71) Applicant: PROFOTO AB, Sundbyberg (SE)

(72) Inventors: Pär Blixt, Vaxholm (SE); John Carrick, Skogås (SE)

(73) Assignee: PROFOTO AB, Sundbyberg (SE)

( * ) Notice: Subject to any disclaimer, the term of this patent is extended or adjusted under 35 U.S.C. 154(b) by 0 days.

(21) Appl. No.: 15/525,542

(22) PCT Filed: Oct. 28, 2015

(86) PCT No.: PCT/SE2015/051140
§ 371 (c)(1),
(2) Date: May 9, 2017

(87) PCT Pub. No.: WO2016/080885
PCT Pub. Date: May 26, 2016

(65) Prior Publication Data
US 2017/0314767 A1    Nov. 2, 2017

(30) Foreign Application Priority Data
Nov. 19, 2014  (SE) .................................... 1451392

(51) Int. Cl.
A47B 96/00 (2006.01)
F21V 17/10 (2006.01)
G03B 15/06 (2006.01)
F16M 13/02 (2006.01)

(52) U.S. Cl.
CPC ............ F21V 17/10 (2013.01); F16M 13/02 (2013.01); G03B 15/06 (2013.01)

(58) Field of Classification Search
CPC .............................. F21V 17/10; F16M 13/02
USPC ................ 248/222.11, 222.12, 341; 362/341
See application file for complete search history.

(56) References Cited

U.S. PATENT DOCUMENTS

| 2,948,287 | A | 8/1960 | Rupert | |
| 6,371,630 | B1* | 4/2002 | Unger | F21V 21/02 362/148 |
| 2003/0205262 | A1 | 11/2003 | Woodward | |
| 2005/0225989 | A1* | 10/2005 | Harlocker | G03B 15/06 362/341 |
| 2008/0137352 | A1 | 6/2008 | O'Brien et al. | |
| 2011/0069472 | A1* | 3/2011 | Peregrine | G03B 15/02 362/11 |

(Continued)

OTHER PUBLICATIONS

International Search Report and Written Opinion for PCT Application No. PCT/SE2015/051140, dated Feb. 16, 2016, 8 pages.

*Primary Examiner* — Gwendolyn W Baxter
(74) *Attorney, Agent, or Firm* — Knobbe, Martens, Olson & Bear, LLP

(57) ABSTRACT

A support ring is for mounting of a soft box on a light source. The support ring includes a connector for attachment of the support ring to the light source, and at least one cavity configured to receive support pins of the soft box. The cavity further includes a first and a second support element arranged to counteract a torque from the support pins, when the support pins are in an inserted position in the cavity. At least one entry element on a radial outside of the cavity is arranged to counteract a force required to bend the support pin to an angle where the support pin can be inserted into the cavity.

20 Claims, 2 Drawing Sheets

(56) References Cited

U.S. PATENT DOCUMENTS

| | | | |
|---|---|---|---|
| 2013/0010476 A1* | 1/2013 | Pickard | F21S 8/026 362/311.03 |
| 2014/0078743 A1* | 3/2014 | Wu | F21V 21/00 362/294 |
| 2014/0153277 A1* | 6/2014 | Lai | F21V 17/10 362/558 |

* cited by examiner

SUPPORT RING FOR MOUNTING OF A SOFT BOX ON A LIGHT SOURCE

TECHNICAL FIELD

The present disclosure relates to a support ring for mounting of a soft box on a light source. The disclosure also relates to a method for manufacturing a support ring for mounting of a soft box on a light source.

BACKGROUND

A soft box is a type of photographic lighting device. A soft box creates an even and diffused light by directing light through some diffusing material, or by "bouncing" light off a second surface to diffuse the light. One type of bouncing source is an umbrella light where the light from the bulb is bounced off the inside of a metalized umbrella to create a soft indirect light.

One type of soft box is an enclosure around a light source comprising reflective side and back walls and a diffusing material at the front of the light.

The sides and back of the soft box are lined with a bright surface—an aluminized fabric surface or an aluminium foil, to act as an efficient reflector. A speed ring is a solid metal ring-shaped disk which is used to attach a soft box to a light source such as a studio strobe or a continuous light source. Often there are between 4 to 8 holes drilled into the circumference of the ring. These holes receive the support pins of the soft box. Support pins are then held in place in the holes by tension. The shape of the speed ring can vary depending on the manufacturer.

Typically the opening in the centre ranges from 4 to 7 inches, allowing the light source to enter the soft box or other light modifier.

Soft boxes, especially large soft boxes require a lot of manual effort during installation. The support pins must be manually bent and angled perpendicular to the centre axis of the speed ring in order to be able to be inserted in the hole of the speed ring. The force required increases with the number of metal ribs which have to be fitted.

Today there are prior art solutions where the metal ribs are brought into articulated sleeves. In these solutions it is much easier to turn up every metal rib, supported by the articulated sleeves. However, these solutions are expensive and complicated to manufacture since they consists of many parts.

There is therefore a need for an improved solution for mounting of a soft box on a light source, which solution solves or at least mitigates at least one of the above mentioned problems.

SUMMARY

It is an object of the present disclosure to provide embodiments reducing the amount of manual effort required to mount a soft box on a light source.

A concept involves providing a support ring with an entry element arranged on a radial outside and arranged to counteract a force required to bend the support pin to an angle where the support pin can be inserted into the support ring.

The disclosure presents a support ring for mounting of a soft box on a light source. The support ring comprises attachment means for attachment of the support ring to the light source, at least one cavity configured to receive support pins of the soft box. The cavity further comprises a first and a second support element arranged to counteract a torque from the support pins, when the support pins are in an inserted position in the cavity, and at least one entry element arranged on a radial outside of the cavity and arranged to counteract a force required to bend the support pin to an angle where the support pin can be inserted into the cavity.

By providing the support ring with at least one entry element arranged on a radial outside of the cavity and arranged to counteract a force required to bend the support pin to an angle where the support pin can be inserted into the cavity, it becomes much easier to insert the support pin into the cavity since the entry element can counter force the support pin when the support pin is bent. Thus it is only required to pull the support pin in order to bend the support pin so that the support pin can be inserted into the cavity.

The present disclosure also relates to embodiments of a method for manufacturing a support ring for mounting of a soft box on a light source. The method comprises providing the support ring with attachment means for attachment of the light source on the support ring. Providing the support ring with at least one cavity configured to receive support pins of the soft box. Providing the cavity with a first and a second support element arranged to counteract a torque from the support pins, when the support pins are in an inserted position in the cavity. And providing the cavity with at least one entry element arranged on a radial outside of the cavity and arranged to counteract a force required to bend the support pin to an angle where the support pin can be inserted into the cavity.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
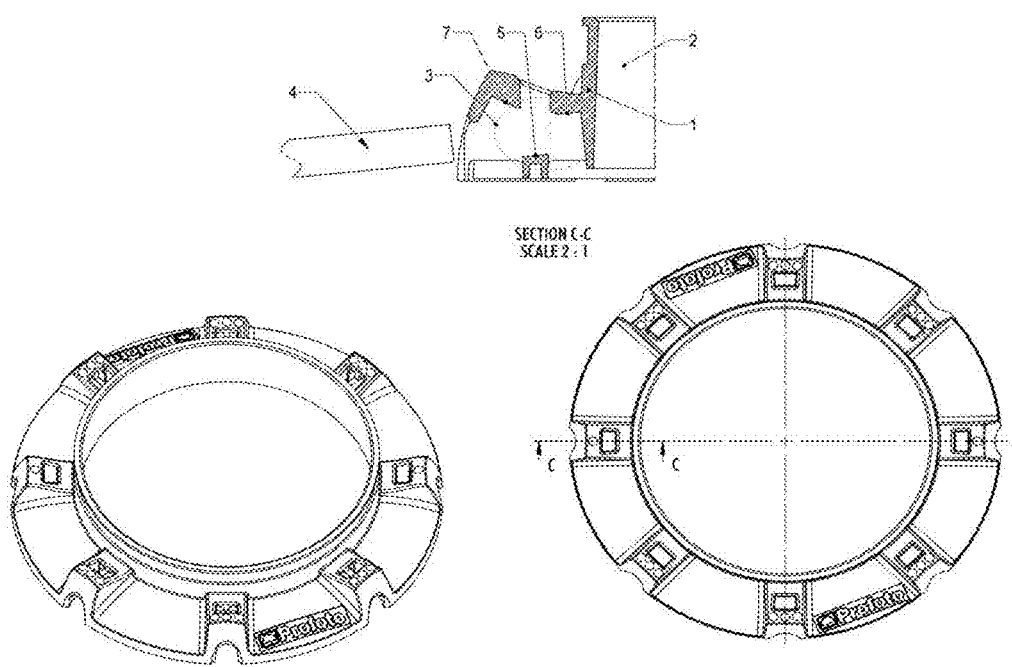
FIG. 1 schematically illustrates a support ring according to an exemplary embodiment of the present disclosure.

Aspects of the present disclosure will be described more fully hereinafter with reference to the accompanying drawings. The devices and methods disclosed herein can, however, be realized in many different forms and should not be construed as being limited to the aspects set forth herein. Like numbers in the drawings refer to like elements throughout.

The general object or idea of embodiments of the present disclosure is to address at least one or some of the disadvantages with the prior art solutions described above as well as below. The various aspects described below in connection with the FIGURES should be primarily understood in a logical sense.

The terminology used herein is for the purpose of describing particular aspects of the disclosure only, and is not intended to limit the disclosure to any particular embodiment. As used herein, the singular forms "a", "an" and "the" are intended to include the plural forms as well, unless the context clearly indicates otherwise.

Figure 2:
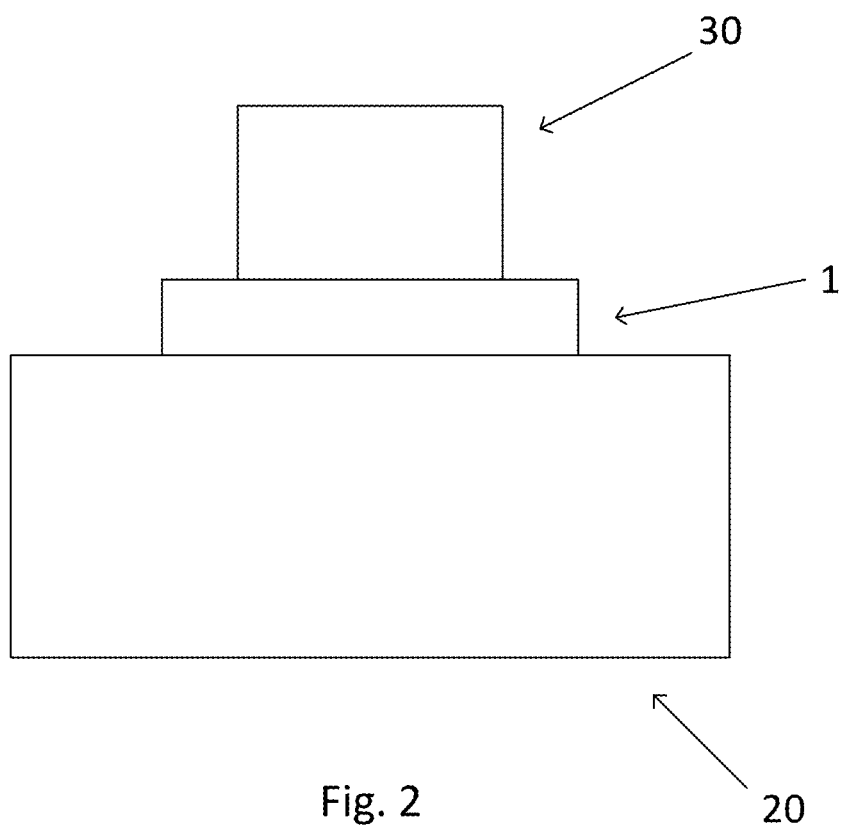
FIG. 2 schematically illustrates a soft box on a light source according to an exemplary embodiment of the present disclosure.

FIG. 1 schematically illustrates a support ring 1 for mounting of a soft box 20 on a light source 30 (see FIG. 2). The support ring 1 comprises attachment means 2 for attachment of the support ring 1 to the light source. Further the support ring comprises at least one cavity 3 configured to receive support pins 4 of the soft box. According to an aspect of the present disclosure the cavity 3 further comprises a first 5 and a second 6 support element arranged to counteract a torque from the support pins, when the support pins are in an inserted position in the cavity; and at least one entry element 7 arranged on a radial outside of the cavity 3 and arranged to counteract a force required to bend the support pin to an angle where the support pin can be inserted into the cavity 3. The at least one cavity 3 can also be a space that among others is narrowed by the first 5 and the second 6 support elements.

By providing the support ring 1 with at least one entry element 7 arranged on a radial outside of the cavity 3 and arranged to counteract a force required to bend the support pin to an angle where the support pin can be inserted into the cavity 3, it becomes much easier to insert the support pin 4 into the cavity 3 since the entry element 7 can counter the force from the support pin 4 when the support pin 4 is bent. Thus it is only required to pull the support pin 4 in order to bend the support pin 4 so that the support pin 4 can be inserted into the cavity 3.

The support ring 1 can be manufactured in many different materials. Preferably the support ring 1 is made of cast aluminium. An advantage with manufacturing the support ring 1 in cast aluminium is that the manufacturing process is easy which means that the support ring 1 can be produced at a low cost. Another advantage by manufacturing the support ring 1 in aluminium is that the support ring 1 becomes strong and light weight.

The cavity 3 in the support ring 1 may be embodied in many different ways. It is however important that the cavity has at least the first 5 and the second 6 support element arranged to counteract a torque from the support pins 4, when the support pins 4 are in an inserted position in the cavity 3. According to one aspect of the present disclosure is the cavity 3 cylinder shaped and has a diameter that is adapted to the diameter of the support pins 4.

According to one aspect of the present disclosure, in an embodiment where the cavity 3 is cylinder shaped, the first 5 and the second 6 support elements are inner wall sections of the cylinder 3.

According to another aspect of the present disclosure the cross section of the cavity 3 perpendicular to the radial direction is rectangular or quadratic. In this embodiment the dimension of the cross section is adapted to fit the diameter of the support pins 4.

In the exemplary embodiment of the present disclosure where the cross section of the cavity 3 perpendicular to the radial direction is rectangular or quadratic the first 5 and the second 6 support elements can be interval sections of the quadratic cavity 3.

According to another aspect of the present disclosure the first 5 and the second 6 support elements are bar elements perpendicular to a radial direction of the cavity 3. The first 5 and the second 6 support elements can be bar elements perpendicular to a radial direction of the cavity 3 in exemplary embodiments were the cavity 3 has different shape.

The cavity 3 does not have to be a closed space. An advantage with the cavity 3 not being a closed space is that the weight of the support ring 1 can be reduced.

In one exemplary embodiment were the first 5 and the second 6 support elements are bar elements 5, 6, the cross section of the cavity is rectangular or quadratic. In another exemplary embodiment were the first 5 and the second 6 support elements are the bar elements 5, 6 the cross section of the cavity is cylinder shaped.

The at least one entry element 7 may be embodied in many different ways. According to one aspect of the present disclosure the at least one entry element 7 is an outer edge of the cavity 3. An advantage with this embodiment is that it is not necessary to bend the support pin as much before the outer edge 7 can counteract the force, since the outer edge 7 is positioned further away from the centre of the support ring than the other edge of the cavity. The outer edge of the cavity can be embodied in many different ways. It is however important that the outer edge can counteract a force required bending the support pin to an angle where the support pin can be inserted into the cavity 3.

According to another aspect of the present disclosure the at least one entry element 7 is an element arranged at the radial outer opening of the cavity 3. This element can be embodied in many different ways. It is however important that the element can counteract a force required bending the support pin to an angle where the support pin can be inserted into the cavity 3.

The present disclosure also relates to a method for manufacturing a support ring 1 for mounting of a soft box on a light source. The method comprises a first step of providing the support ring 1 with attachment means 2 for attachment of the light source on the support ring 1. In a next step the support ring 1 is provided with at least one cavity 3 configured to receive support pins 4 of the soft box. Thereafter in yet another step the cavity 3 is provided with a first 5 and a second 6 support element arranged to counteract a torque from the support pins, when the support pins are in an inserted position in the cavity 3. Next, the cavity 3 is provided with at least one entry element 7 arranged on a radial outside of the cavity 3 and arranged to counteract a force required to bend the support pin to an angle where the support pin can be inserted into the cavity 3.

According to one aspect of the present disclosure the method of manufacturing the support ring 1 comprises manufacturing the support ring wherein the cavity 3 is cylinder shaped and wherein the diameter of the cylinder is adapted to the diameter of the support pins 4.

The support ring can be manufactured so that the first 5 and the second 6 support elements are inner wall sections of the cylinder.

According to another aspect of the manufacturing method a cross section of the cavity 3 perpendicular to the radial direction is rectangular or quadratic and the dimension of the radial intersection is adapted to fit the diameter of the support pins 4.

Further in the method of manufacturing the support ring, the first 5 and the second 6 support elements are inner wall sections of the rectangular or quadratic cavity 3. In another exemplary embodiment the first 5 and the second 6 support elements are bar elements perpendicular to a radial direction of the cavity 3.

According to one aspect of the manufacturing method the at least one entry element 7 is an outer edge of the cavity 3. In another embodiment of the method the at least one entry element 7 is an element arranged at the radial outer opening of the cavity 3.

In some implementations and according to some aspects of the disclosure of the method for manufacturing, the steps can occur in another order than the order described. For example, two method steps shown in succession can in fact be executed substantially concurrently or the method steps can sometimes be executed in the reverse order, depending upon the manufacturing method. Especially if the support ring 1 is made of cast aluminium, the method steps are executed substantially concurrently.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A support ring for mounting of a soft box on a light source, the support ring comprising:
   an attachment wall configured to attach the support ring to the light source, the attachment wall at least partially forming an attachment wall opening within which the light source is configured to be positioned; and
   at least one cavity formed at least partially by the attachment wall, the cavity separate from the attachment wall opening, the cavity configured to receive a support pin of the soft box, the cavity comprising:
      a first support element and a second support element at least partially forming the cavity, the first and second support elements arranged to counteract a torque from the support pin with the support pin in an inserted position in the cavity; and
      at least one entry element at least partially forming the cavity, the at least one entry element arranged on a radial outside of the cavity and arranged to counteract a force required to bend the support pin to an angle where the support pin can be inserted into the cavity.

2. The support ring according to claim 1, wherein the cavity is cylinder shaped and wherein the diameter of the cylinder is adapted to the diameter of the support pin.

3. The support ring according to claim 2, wherein the first and the second support elements are inner wall sections of the cylinder.

4. The support ring according to claim 1, wherein a cross section of the cavity perpendicular to the radial direction is rectangular or quadratic and wherein the dimension of the cross section is adapted to fit the diameter of the support pin.

5. The support ring according to claim 4, wherein the first and the second support elements are inner wall sections of the rectangular or quadratic cavity.

6. The support ring according to claim 1, wherein the first and the second support elements are bar elements perpendicular to a radial direction of the cavity.

7. The support ring according to claim 1, wherein the at least one entry element is an outer edge of the cavity.

8. The support ring according to claim 1, wherein the at least one entry element is arranged at a radial outer opening of the cavity.

9. A method for manufacturing a support ring for mounting of a soft box on a light source, the method comprising:
   providing the support ring with an attachment wall configured to attach the light source on the support ring;
   providing the attachment wall with an attachment wall opening within which the light source is configured to be positioned;
   providing the support ring with at least one cavity formed at least partially by the attachment wall, the cavity separate from the attachment wall opening, the at least one cavity configured to receive a support pin of the soft box;
   providing the cavity with a first support element and a second support element at least partially forming the cavity, the first and second support elements arranged to counteract a torque from the support pin with the support pin in an inserted position in the cavity; and
   providing the cavity with at least one entry element at least partially forming the cavity, the at least one entry element arranged on a radial outside of the cavity and arranged to counteract a force required to bend the support pin to an angle where the support pin can be inserted into the cavity.

10. The method according to claim 9, shaping the cavity as a cylinder and adapting the diameter of the cylinder to the diameter of the support pin.

11. The method according to claim 10, providing the first and the second support elements as inner wall sections of the cylinder.

12. The method according to claim 9, providing the cavity with a rectangular or quadratic cross section of the cavity perpendicular to the radial direction, and adapting the dimension of the radial intersection to fit the diameter of the support pin.

13. The method according to claim 12, providing the first and the second support elements as inner wall sections of the rectangular or quadratic cavity.

14. The method according to claim 9, providing the first and the second support elements as bar elements perpendicular to a radial direction of the cavity.

15. The method according to claim 9, providing the at least one entry element as an outer edge of the cavity.

16. The method according to claim 9, arranging the at least one entry element at a radial outer opening of the cavity.

17. A support ring for mounting a soft box on a light source, the support ring comprising:
   an attachment wall configured to attach the support ring to the light source, the attachment wall at least partially forming an attachment wall opening within which the light source is configured to be positioned, the attachment wall at least partially forming a cavity configured to receive a support pin of the soft box, wherein the cavity is separate from the attachment wall opening;
   a first support member connected to the attachment wall and at least partially forming the cavity, the first support member configured to counteract a torque from the support pin with the support pin in the cavity;
   a second support member connected to the attachment wall and at least partially forming the cavity, the second support member configured to counteract the torque from the support pin with the support pin in the cavity; and
   an entry member connected to the attachment wall and at least partially forming the cavity at a radial distance of the support ring greater than that of the first and second support members, the entry member configured to counteract a force required to bend the support pin to an angle where the support pin can be inserted into the cavity.

18. The support ring according to claim 17, wherein the first and the second support members are inner wall sections of the cavity.

19. The support ring according to claim 17, wherein the entry member is an outer edge of the cavity.

20. The support ring according to claim 17, wherein the entry member is arranged at a radial outer opening of the cavity.

* * * * *

UNITED STATES PATENT AND TRADEMARK OFFICE
CERTIFICATE OF CORRECTION

PATENT NO. : 10,197,250 B2
APPLICATION NO. : 15/525542
DATED : February 5, 2019
INVENTOR(S) : Blixt et al.

Page 1 of 1

It is certified that error appears in the above-identified patent and that said Letters Patent is hereby corrected as shown below:

In the Claims

In Column 5, Line 63, Claim 9, before "cavity" delete "at least one".

Signed and Sealed this
Thirteenth Day of October, 2020

Andrei Iancu
*Director of the United States Patent and Trademark Office*